(12) United States Patent
Osada (10) Patent No.: US 8,092,060 B2
(45) Date of Patent: Jan. 10, 2012

(54) CRADLE

(75) Inventor: Yasuo Osada, Saitama (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 12/020,631

(22) Filed: Jan. 28, 2008

(65) Prior Publication Data

US 2008/0205070 A1 Aug. 28, 2008

(30) Foreign Application Priority Data

Feb. 22, 2007 (JP) .................... 2007-042931

(51) Int. Cl.
*F21V 8/00* (2006.01)
(52) U.S. Cl. ....................... 362/555; 362/362
(58) Field of Classification Search ............. 362/551, 362/555, 196, 200, 362; 248/346.01, 346.03; 320/115, DIG. 18, DIG. 19, DIG. 20, DIG. 21
See application file for complete search history.

(56) References Cited

U.S. PATENT DOCUMENTS

| 5,151,643 | A | * | 9/1992 | Emmert et al. | 320/115 |
| 6,499,852 | B1 | * | 12/2002 | Kino et al. | 362/23 |
| 2006/0209559 | A1 | * | 9/2006 | Lim | 362/555 |
| 2006/0291245 | A1 | * | 12/2006 | Shimada | 362/612 |

FOREIGN PATENT DOCUMENTS

| JP | 2003-87983 | 3/2003 |
| JP | 2003-163721 | 6/2003 |
| JP | 2003-174729 | 6/2003 |
| JP | 2003-204462 | 7/2003 |
| JP | 2005-151710 | 6/2005 |
| JP | 2005-229784 | 8/2005 |

* cited by examiner

*Primary Examiner* — Sharon Payne
(74) *Attorney, Agent, or Firm* — Oblon, Spivak, McClelland, Maier & Neustadt, L.L.P.

(57) ABSTRACT

A cradle includes a housing, an indicator configured to display a status by emitting light, a light-emitting unit serving as a light source for causing the indicator to emit the light, and a reflection unit for guiding the light emitted from the light-emitting unit to the indicator by reflecting the emitted light to the indicator.

17 Claims, 11 Drawing Sheets

|   | GENRE | ARTIST | ALBUM | MUSIC NAME | FILE NAME |
|---|---|---|---|---|---|
| 1 | ROCK | MJ | AA | ABC | ABC.mp3 |
| 2 | ROCK | MJ | AA | XYZ | XYZ.mp3 |
| 3 | POPS | DJ | BB | BCD | BCD.at3 |
| ⋮ | | | | | |
| N | JAZZ | ZJ | ZZ | ZYX | ZYX.mp4 |

FIG. 3B

|   | GENRE | DIRECTOR | TITLE | FILE NAME |
|---|---|---|---|---|
| 1 | DOCUMENTARY | | MMM | MMM.mpg |
| 2 | ACTION | MD | NNN | NNN.mpg |
| 3 | DRAMA | MG | LLL | LLL.mpg |
| ⋮ | | | | |
| N | DRAMA | MH | HHH | HHH.mpg |

CRADLE

CROSS REFERENCES TO RELATED APPLICATIONS

The present invention contains subject matter related to Japanese Patent Application JP 2007-042931 filed in the Japanese Patent Office on Feb. 22, 2007, the entire contents of which are incorporated herein by reference.

BACKGROUND OF THE INVENTION

1. Field of the Invention

The present invention relates to cradles, and, in particular, to a cradle on which a portable player is mounted and which supplies another device with a signal from the portable player.

2. Description of the Related Art

Portable playback devices are widely used as playback devices for playing back music. The portable playback devices include storage units such as hard disks or semiconductor memories, and record digitized music signals in the storage units. The portable playback devices read the recorded digital signals, perform digital-to-analog conversion on the read signals, and output the converted signals. According to the portable playback devices, many pieces of music can be recorded and can be read as needed. Accordingly, music can be freely selected and played back without carrying many CDs (compact discs).

A portable playback device of the above type is mounted on a cradle as disclosed in Japanese Unexamined Patent Application Publication No. 2003-163721, whereby data can be shared with a personal computer and another device, or a secondary battery of the portable playback device can be charged.

As described above, instead of carrying the portable playback device, the portable playback device can be mounted on the cradle, whereby the cradle can send a signal from the portable playback device to a different device such as an audio amplifier. In this case, an indicator of the cradle displays an operating state, whereby the operating state can be externally, easily viewed. In other words, by providing an indicator on a housing of the cradle, and irradiating the indicator with light from, for example, an LED (light-emitting diode) as a light source so that the indicator emits light, the operating state can be displayed. However, in a case in which the indicator, which circumferentially extends over a semicircle of the cradle, is caused to emit light by a single LED, a defect occurs in that the brightness thereof has irregularity since the light cannot be uniformly guided in a circumferential direction.

In view of this defect, by providing a light guide plate inside the indicator, and using the light guide plate to guide light from the LED, the light can be guided to substantially the entirety of even a relatively long indicator. However, in the case of, for example, an indicator that extends over a circumferential semicircular portion of the cradle housing, it is very difficult to cause the indicator to uniformly emit light. In a case of the related art, in order to uniformly irradiate an indicator that extends over a circumferential semicircular portion of a cradle housing, it is necessary to use a plurality of LEDs, or it is necessary to provide a large light guide plate. This complicates the mechanism for light-emitting display by the indicator and causes a problem of a high cost.

SUMMARY OF THE INVENTION

It is desirable to provide a cradle capable of causing a relatively long indicator to substantially uniformly emit light, even if a single light-emitting unit such as a light-emitting diode is used.

It is also desirable to provide a cradle in which an indicator provided so as to extend over substantially a circumferential semicircular portion of a cradle housing is allowed to emit light without irregularity in brightness.

It is also desirable to provide a cradle in which light from a light-emitting unit is guided without using a light guide plate and a reduced number of parts is used, and which is effective in reducing manufacturing cost.

It is also desirable to provide a cradle which does not need any special reflection unit, and in which an indicator provided so as to circumferentially extend on an outer peripheral surface of a cradle housing is allowed to uniformly emit light by using an originally necessary member to reflect light from a light-emitting unit.

According to an embodiment of the present invention, a cradle includes a housing, an indicator configured to display a status by emitting light, light-emitting means serving as a light source for causing the indicator to emit the light, and reflection means for guiding the light emitted from the light-emitting means to the indicator by reflecting the emitted light to the indicator.

Preferably, the housing includes a mounting portion on which a portable playback device is mounted.

The mounting portion on which the portable playback device is mounted may include a connector.

The cradle may further include an antenna for receiving a signal from an information terminal.

The light-emitting means may be a light-emitting diode mounted on a circuit board provided in the housing.

The indicator may be an arc-shaped translucent-white light guide member which is exposed at an outer peripheral surface of the housing and which extends circumferentially.

The reflection means may be included in a weight provided under the housing. A reflection portion of the weight may be exposed at an opening in the housing. The light emitted from the light-emitting means may be guided to the indicator in such a manner that the emitted light is reflected through the opening by the reflection portion of the weight.

The reflection means may be formed on a surface of a weight provided under the housing. The reflection means may be exposed at an opening in the housing. The light emitted from the light-emitting means may be guided to the indicator in such a manner that the emitted light is reflected through the opening by the reflection means.

The reflection portion of the weight or the reflection means may be provided, inside the arc-shaped translucent-white light guide member, in proximity to the circumferential center of the arc-shaped translucent-white light guide member.

According to the embodiment, light from light-emitting means is guided to an indicator after being reflected by reflection means. Thus, a status can be displayed in a state in which the entirety of the indicator is allowed to substantially uniformly emit light. In addition, the use of single light-emitting means enables displaying a status without using special means such as a light guide plate. Thus, a cradle which is effective in reducing manufacturing cost since a reduced number of parts is used, and which has a simple structure can be provided.

According to another embodiment of the present invention, a cradle includes a housing, an indicator configured to display a status by emitting light, light-emitting means serving as a light source for causing the indicator to emit the light, and reflection means for guiding the light emitted from the light-emitting means to the indicator by reflecting the emitted light to the indicator. The indicator is mounted in a junction between an upper case and a lower case that form the housing, and a weight is attached to an underside of the lower case and the weight is provided with the reflection means.

The upper case and the lower case may be bonded to each other by screws screwed from the side of the lower case, and the weight is attached to the underside of the lower case so as to cover heads of the screws.

In the cradle, pawls may be provided at a periphery of the weight and the pawls are engaged in openings of engagement holes of the lower case, and the weight may be locked such that a locking protrusion of an elastic member of the lower case is inserted into a lock hole of the weight.

The pawls of the weight may be disengaged from the openings of the engagement holes in such a manner that the elastic member is elastically deformed by inserting a pin from the lock hole to press the locking protrusion and the weight is circumferentially turned by a small angle, with the locking protrusion disengaged from the lock hole.

In the cradle, pawls may be provided at a periphery of the weight and the pawls are engaged in openings of engagement holes of the lower case, and the weight may be locked such that a lock hole of an elastic member of the lower case receives a locking protrusion of the weight.

The pawls of the weight may be disengaged from the openings of the engagement holes in such a manner that the weight is circumferentially turned by a small angle in a state in which engagement between the lock hole of the elastic member and the locking protrusion of the weight is released by inserting a pin through a small hole of the weight to press the elastic member of the lower case.

According to the embodiment, light from light-emitting means is reflected by reflection means of a weight attached to an underside of a lower case, and the light is guided to an indicator mounted in a junction between an upper case and a lower case, whereby a status can be displayed in a state in which the indicator is allowed to emit light. Therefore, in a case in which the weight includes the reflection means, the light from the light-emitting means can be reflected without additionally providing special reflection means. Alternatively, by providing reflection means at a predetermined position on the weight, the light from the light-emitting means can be reflected and guided to the indicator in a very simple structure.

DESCRIPTION OF THE PREFERRED EMBODIMENTS

Figure 1A:
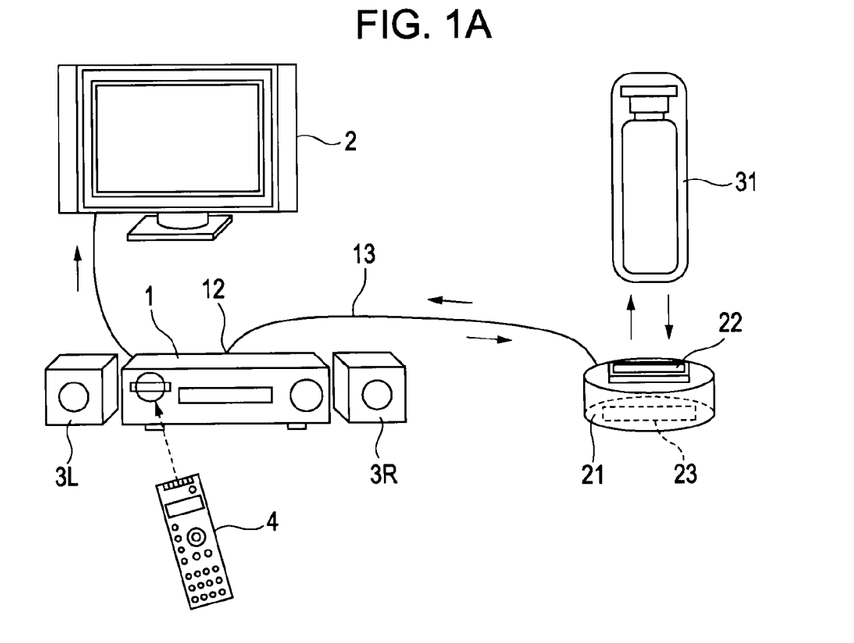
FIGS. 1A and 1B are perspective views showing schematic configurations of a content playback system according to an embodiment of the present invention.
Figure 1B:
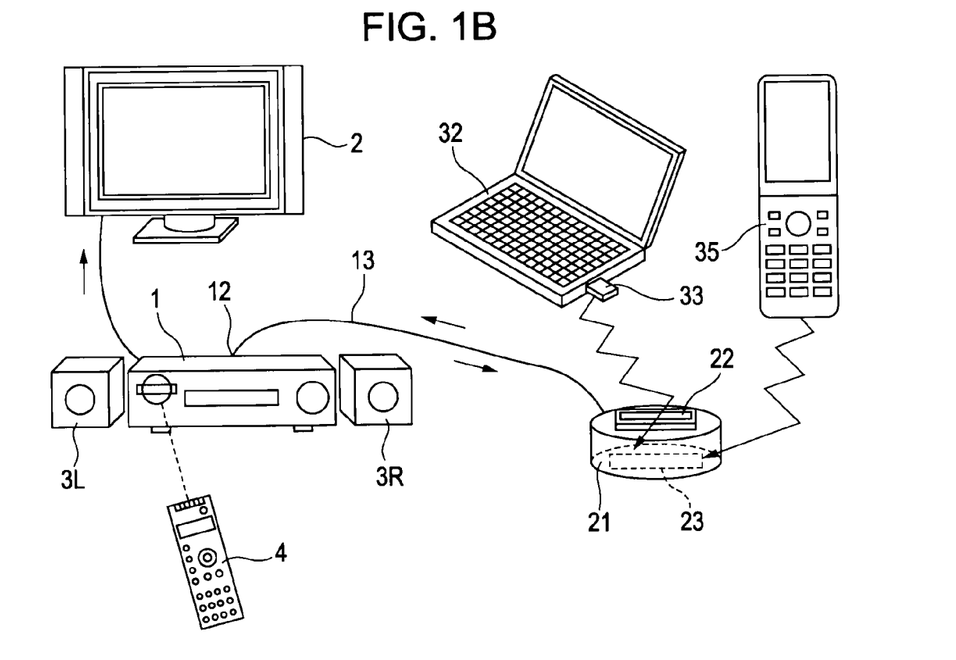

An embodiment of the present invention is described below. FIGS. 1A and 1B show schematic configurations of a content selection playback system in the embodiment. A display 2 and channel speakers 3L and 3R are connected to an AV (audio visual) device 1 as a content playback device. The AV device 1 can be operated by using press buttons provided on a front panel and a commander 4 for remote control. Here, content means creations such as audio information and video information provided through medium and networks.

The AV device 1 is, for example, an AV amplifier, and switches between externally input video and audio signals and supplies the switched signal to the display 2 and the speakers 3L and 3R. Another example of the AV device 1 is an AV amplifier having a disc playback function. In this case, the AV device 1 includes a playback unit for a CD, a DVD (digital versatile disc), a CD-R (recordable), CD-RW (rewritable), next-generation optical disc BD (Blu-ray disc), etc.

A port 12 is provided on a back face (or front face) of the AV device 1. A connector connected to one end of a cable 13 is connected to the port 12. The other end of the cable 13 is connected to a cradle 21 as a content playback device controller. The port 12 and the cable 13 form a first connection unit. Specific examples of the first connection unit include an interface based on a manufacturer-specific standard, USB (Universal Serial Bus), IEEE (Institute of Electrical and Electronics Engineers) 1394. The first connection unit is not limited to a wired interface and may be a wireless interface. Examples of the wireless interface include Bluetooth, a wireless LAN (local area network), and UWB (Ultra Wide Band).

A cradle 21 has a shape of a stand for a portable playback device 31, for example, a digital audio player. The cradle 21 includes a mounting portion 22 having a recess into which one end portion of the portable playback device 31 can be inserted, and a mechanical contact to be connected to a mechanical contact of the portable playback device 31 which is positioned in the recess. The mounting portion 22 is an example of a second connection unit. Similarly to the above first connection unit, a wired or wireless interface can be used as the second connection unit.

FIG. 1A shows a configuration in which a connector 69 (see FIG. 6) provided in the mounting portion 22 extracts a signal from the portable playback device 31. FIG. 1B shows a configuration in which a built-in receiving antenna 23 of the cradle 21 receives signals from a personal computer 32 and a cellular phone 35 in a wireless manner without using a mechanical connection. When a signal is received by the personal computer 32, a wireless-LAN transmitting/receiving unit 33 is connected to the personal computer 32, and the transmitting/receiving unit 33 transmits a signal to the cradle 21.

The portable playback device 31 includes a medium (recording medium), for recording digital audio data, such as a flash memory (a memory card or built-in flash memory) and a hard disk, a file system for managing a plurality of files, a decoding unit for decoding a compression-encoded signal of a file, a display control circuit, a display unit, an operation unit including operation buttons, and a battery as a power supply. As a portable music playback device, not only the digital audio player, but also a cellular phone or the like can be used. Furthermore, not only the portable music playback device, a portable music/video playback device including a display control circuit and display unit for video playback can be used.

As compression encoding on video data, MPEG-2 (Moving Picture Experts Group-2), MPEG-4, H.264/AVC (Advanced Video Coding), DivX, etc., can be used. As compression encoding on audio data, MP3 (MPEG-1 Audio Layer 3), AAC (Advanced Audio Coding), ATRAC (Adaptive Transfer Acoustic Coding), WMA (Windows Media Audio), etc., can be used.

The interface is wired or wireless. Examples of the wired interface include USB (Universal Serial Bus), IEEE 1394. Examples of the wireless interface include Bluetooth, a wireless LAN, UWB. Transfer (streaming) of content data and transfer of content management data are performed via an interface.

In the content selection playback system according to the embodiment, when the portable playback device 31 is mounted on the mounting portion 22 of the cradle 21, a file stored in the portable playback device 31, for example, a file system (hereinafter referred to as "content management data") for managing music files is read by the cradle 21. An OSD (on screen display) controller as a display control unit of the cradle 21 generates a video signal for displaying an attribute such as a music name included in the content management data or a playlist. The video signal is supplied to the AV device 1 and is displayed on the display 2.

A GUI (graphical user interface) using content selection display is configured. A user views an image displayed on the display 2, and designates music to be played back by operating the commander 4 for remote control. This selection operation signal is transmitted to the cradle 21, and the cradle 21 controls the portable playback device 31 to extract a playback signal of the designated music. The playback signal is reproduced by the AV device 1 and is output by the speakers 3L and 3R. The AV device 1 can perform, as audio content playback modes, sequential playback in which pieces of music are played back in an order of content management data, and shuffle playback in which pieces of music are played back at random. The AV device 1 can perform playback by genre, playback by artist, and playback by album. In other words, when the user designates a playback mode, a piece of music automatically selected in accordance with the playback mode is played back. Instead of using the content selection display of the display 2, by operating the commander 4 for remote control, an operation such as playback can be controlled.

Figure 2:
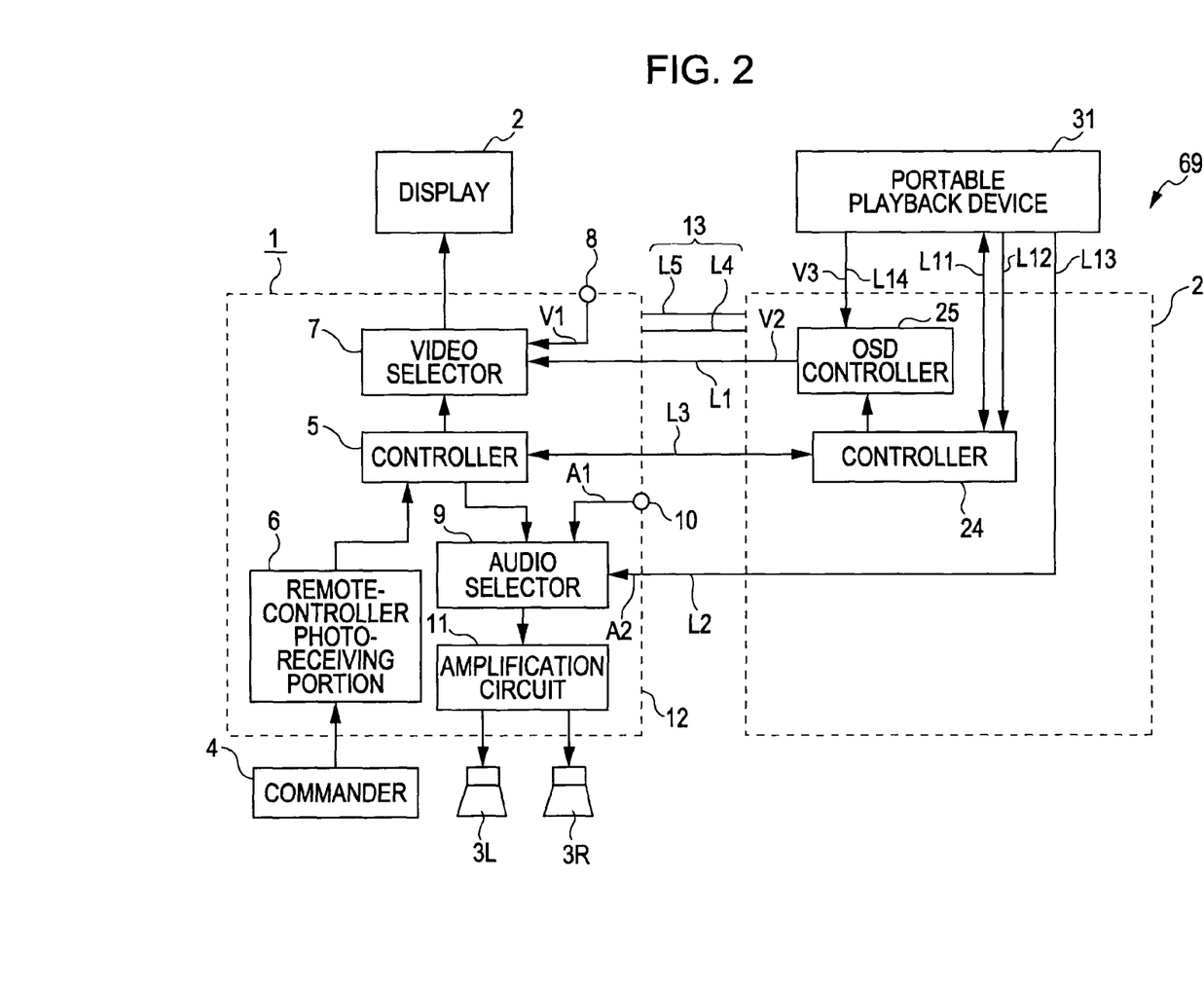
FIG. 2 is a block diagram showing the content playback system according to the embodiment of the present invention.

Furthermore, the embodiment of the present invention is more specifically described with reference to FIG. 2. The AV device 1 includes a controller 5. The controller 5 has a microcomputer configuration including a CPU (central processing unit), a ROM (read-only memory), and a RAM (random access memory). The ROM stores beforehand a program operating on the CPU and data necessary for the operation. The RAM is used as a work memory for the CPU. The CPU reads the program and data stored in the ROM, if necessary, and controls each unit of the AV device 1 while using the RAM as a work memory.

A remote control signal is supplied from a remote-controller photo-receiving portion 6 to the controller 5. The remote control signal is generated such that the commander 4 as an operation unit is operated. The controller 5 controls a video selector 7 and an audio selector 9. A video signal selected by the video selector 7 is supplied to the display 2 and is displayed on the screen of the display 2. An audio signal selected by an audio selector 9 is supplied and reproduced by the speakers 3L and 3R through an amplification circuit 11. The AV device 1 includes an electronic volume unit for volume control, although the electronic volume is not shown.

The cradle 21 includes a controller 24 as a second control unit and an OSD controller 25 as a display control unit. Similarly to the controller 5, the controller 24 has a microcomputer configuration including a CPU. The OSD controller 25 generates a content selecting display signal for selecting content including text on the basis of the content management data. The cradle 21 also includes a charging control unit for charging a battery of the portable playback device 31, although it is not shown.

The cable 13, which extends from the connector connected to the port 12 of the AV device 1, is a bundle of lines L1, L2, L3, L4, and L5. An OSD video signal V2 generated by the OSD controller 25 is supplied to the video selector 7 of the AV device 1 through the line L1. A video signal V1 is supplied from an input video terminal 8 to the video selector 7. One of the video signal V1 and the OSD video signal V2, selected by the video selector 7, is supplied to the display 2.

An analog audio signal A2 reproduced by the portable playback device 31 is supplied to the audio selector 9 through the line L2. The audio selector 9 is supplied with an audio signal A1 from an input audio terminal 10. One of the audio signal A1 and the reproduced audio signal A2, selected by the audio selector 9, is supplied to the speakers 3L and 3R through the amplification circuit 11.

The line L3 is used to exchange (communicate) control signals between the controllers 5 and 24. By way of example, each of the controllers 5 and 24 has a UART (Universal Asynchronous Receiver Transmitter) that is a type of communication circuit used in a serial port of a personal computer. The lines L4 and L5 are transmission lines of a power-supply voltage and the ground potential. The cradle 21 can be supplied with power from the AV device 1.

The portable playback device 31 is mounted on the mounting portion 22 of the cradle 21. By way of example, the mounting portion 22 forms transmission lines L11, L12, L13, and L14 by contact between mechanical contacts. The mounting portion 22 forms a second connection unit. As described above, similarly to the first connection unit, the mounting portion 22 can employ not only the contact between mechanical contacts, but also a wired or wireless interface.

The line L11 is used to transmit control signals between the controller 24 and the portable playback device 31. The line L12 is used to transmit the content management data read from the portable playback device 31 to the controller 24. The lines L11 and L12 may be formed as a single transmission line. The line L13 is used to output the reproduced analog audio signal A2 from the portable playback device 31. The reproduced audio signal A2 is supplied to the audio selector 9 of the AV device 1 through the line L2 of the cable 13.

The line 14 is used to output a reproduced video signal (analog) V3 from the portable playback device 31. The reproduced video signal V3 is supplied to the OSD controller 25, and a signal of the content selection display is superimposed on the reproduced video signal V3. When the portable playback device 31 reproduces only the audio signal, the video signal V3 is not output. In this case, the content selection display is displayed on a background having a single color.

The medium in the portable playback device 31 stores audio (and/or video) content data, and content management data for managing the audio content data. For example, content management data for managing music files include independent content data, and files systems, such as FAT (File Allocation Table) 16 and FAT 32, used in personal computers. Music file transfer methods include a method in which a music file can be transferred by dedicated transfer software since independent content management data is employed, and a method in which file transfer can be performed by a multipurpose file management tool such as the Explorer since multipurpose content management data is employed. Furthermore, the content management data includes a playlist created by the portable playback device 31. The portable playback device 31 employs independent content management data.

The cradle 21 is dedicated to the portable playback device 31. Thus, by sending a command to the portable playback device 31, the controller 24 can read out content management data from the portable playback device 31 through the line L12. The acquired content management data is stored in an RAM in the controller 24. In addition, the controller 24 has a function of interpreting, on the basis of the acquired content management data, a movie title concerning content, music information such as a music name, artist information such as an artist name, and attribute information such as a genre and a playlist.

Figure 3A:
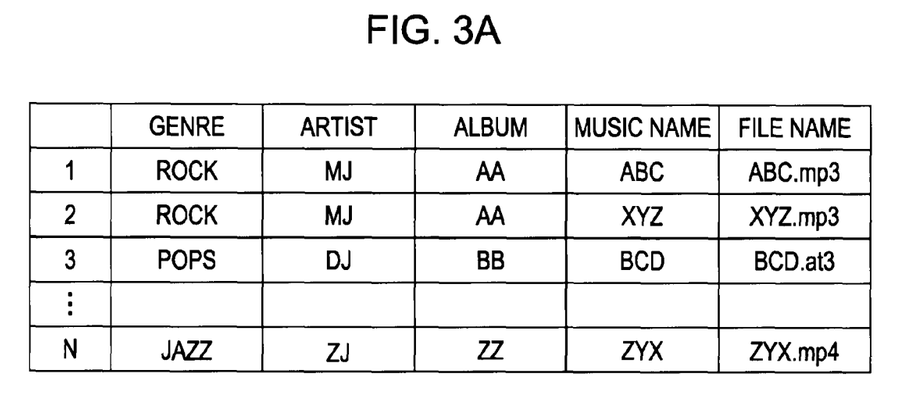
FIGS. 3A and 3B are illustrations showing examples of content management data in the content playback system according to the embodiment of the present invention.
Figure 3B:
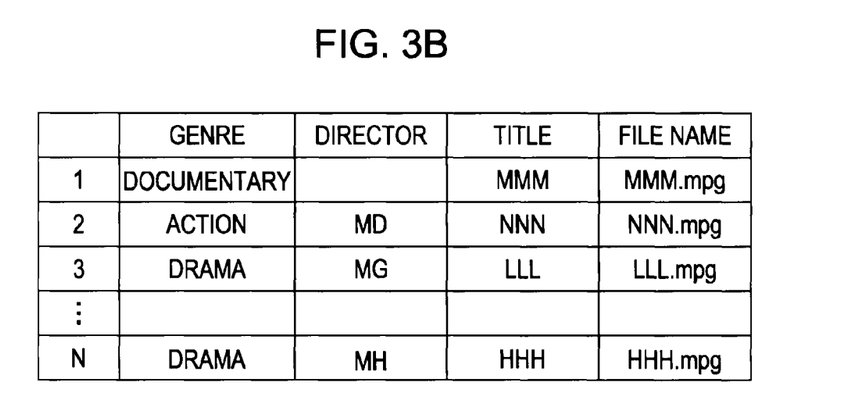

FIGS. 3A and 3B show examples of content management data of the portable playback device 31. FIG. 3A shows an example of music content management data, and FIG. 3B shows an example of video content management data. In the music content management data, in units of N pieces (files) of music, "genre", "artist", "album", "music name", and "file name" are associated as attribute information. In the video content management data, in units of N recorded programs (files), "genre", "director name", "title", and "file name" are associated as attribute information. An extension of each file name represents a compression encoding method of the music (file). For example, the extension "mpg" represents a file compression-encoded by MPEG-4. In the portable playback device 31, a recording position of each piece of content in the medium is also associated, although it is not shown in FIGS. 3A and 3B.

For example, music that has the content ID "1" has, as attribute information, "rock" "MJ", "AA", "ABC", and "ABC.mp3". These alphabets are exemplary and do not have any particular meanings except an extension of the file name. The extension of the file name represents a compression encoding method of the music (file). In the above example, the extension indicates that the file is compression-encoded by MP3. The extension "at3" represents ATRAC3, and the extension "mp4" represents MPEG-4. In the case of a playlist, a playlist file including pieces of content is configured.

When the portable playback device 31 is connected to the cradle 21, and the connected portable playback device 31 is recognized by the controller 24 of the cradle 21, content management data is loaded into the RAM in the controller 24. The controller 24 interprets the content ID and attribute information of the content management data loaded from the portable playback device 31, and supplies the OSD controller 25 with text information necessary for generating a content selecting display signal V2. The content selecting display signal V2 is generated by the OSD controller 25.

Figure 4:
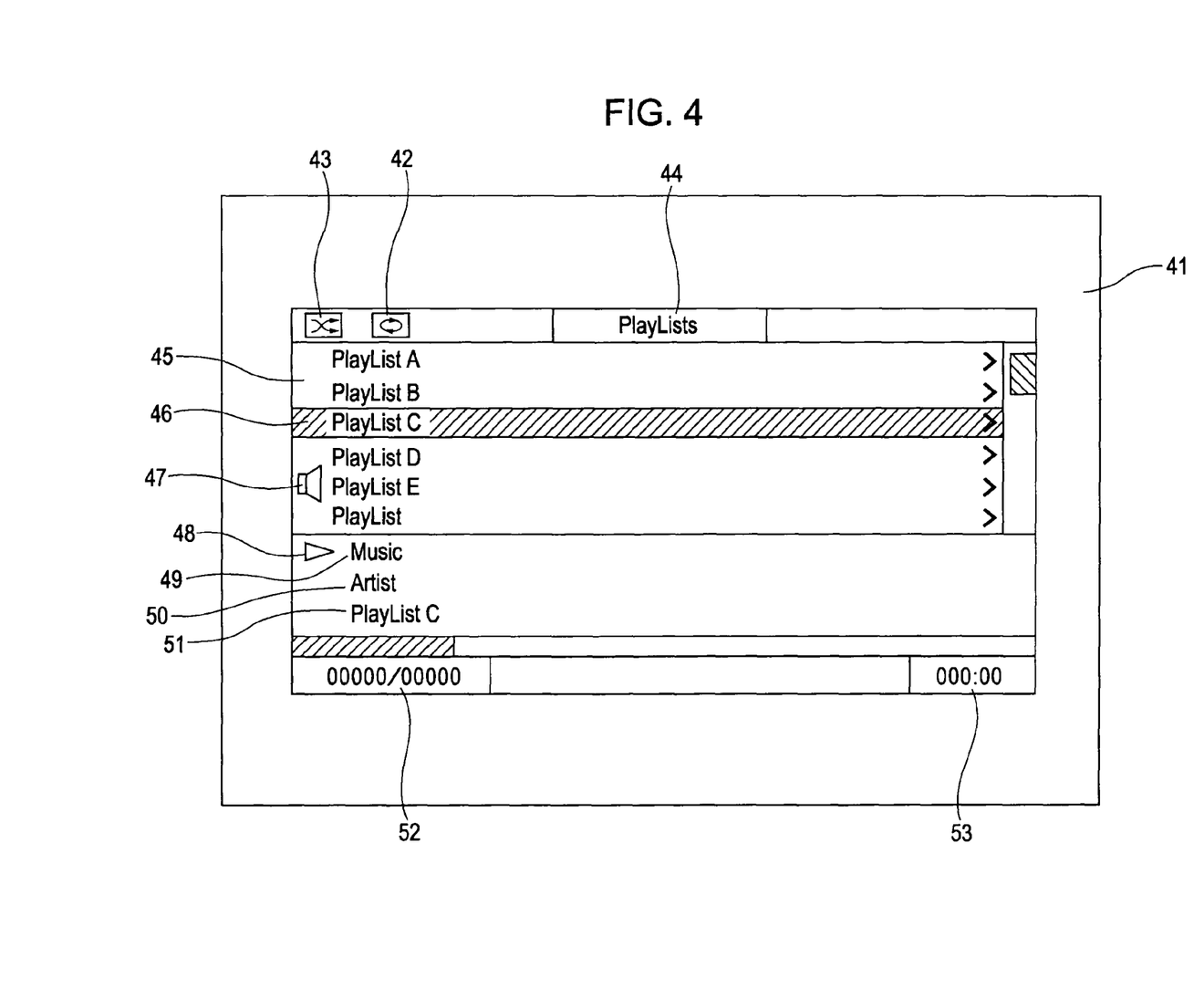
FIG. 4 is an illustration showing an example of a content selecting screen in the content playback system according to the embodiment of the present invention.

FIG. 4 shows an example of a content selecting screen 41 displayed such that the content selecting display signal V2 is supplied to the display 2 through the video selector 7. Referring to display items, a shuffle icon 42 indicating whether shuffle playback has been set and a repeat icon 43 indicating whether repeat playback has been set are displayed as setting item indications. As a menu title 44, for example, "PlayLists" is displayed.

A plurality of playlists 45 are displayed in text, and a scroll bar 46 is positioned on one of the playlists. The scroll bar 46 is scrolled by up and down keys among direction keys of the commander 4 for remote control. A current playback icon 47 is displayed beside a currently played-back playlist.

A running state icon 48 is displayed. Regarding currently played-back music, a track name indication 49, an artist name indication 50, and an album name indication 51 are displayed. Furthermore, a music-playback-number/total-number indication 52, and an elapsed time indication 53 are displayed. The content selecting screen 41 shown in FIG. 4 is an example, and a different screen in accordance with a menu can be displayed.

Figure 5:
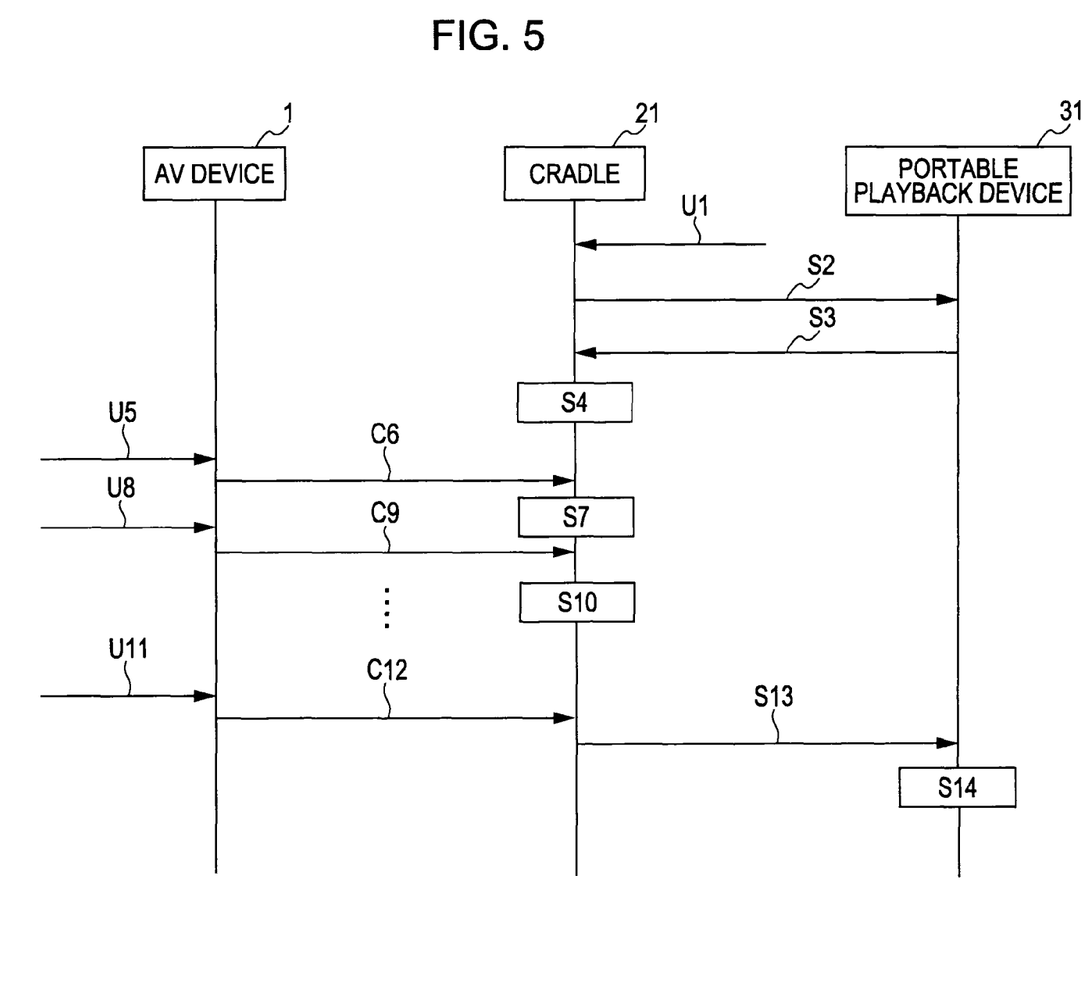
FIG. 5 is a flowchart illustrating the flow of an operation of the content playback system according to the embodiment of the present invention.

An operation of the embodiment of the present invention is described below with reference to FIG. 5. A power supply of the AV device 1 is turned on by pressing a button of the commander 4 or an operation button of the AV device 1, whereby the controller 5 sets states of the video selector 7 and the audio selector 9 so that a video signal and audio signal from the AV device 1 are selected. A state in which the cradle 21 selectively outputs signals is reported to the controller 24 of the cradle 21.

The portable playback device 31 is mounted on the cradle 21 by the user (step U1). The controller 24 of the cradle 21 requests content management data from the portable playback device 31 (step S2). In response to the request, the portable playback device 31 outputs the content management data to the controller 24 of the cradle 21 (step S3). When the controller 24 receives the content management data, the controller 24 interprets the content management data and supplies the OSD controller 25 with data necessary for a content selecting screen. In step S4, the OSD controller 25 generates a content selecting display signal, and the content selecting display signal is supplied to the AV device 1. The display 2 displays the content selecting screen.

The user operates the commander 4 for remote control to select a desired piece of music while viewing the content selecting screen, for example, displayed playlists (see FIG. 4). An operation of selecting the desired piece of music for listening on the basis of hierarchy is represented by a step U5 of user's operating cursor buttons (the up and down keys among the direction keys), a cursor commander C6, changing of a selected list item by moving the scroll bar (step S7), a step U8 of user's operating the cursor buttons, a cursor command C9, and changing of a selected list item by moving the scroll bar (step S10).

The user operates an enter button, with the scroll bar positioned at the desired piece of music for listening (step U11). When the cradle 21 receives an enter command C12, the cradle 21 outputs, to the portable playback device 31, a playback request to play back the desired piece (step S13). When the playback request is output from the cradle 21, the portable playback device 31 initiates playback on the basis of the request (step S14).

Information of a cursor button operating command is received by the controller 5 and is sent to the controller 24 of the cradle 21. The controller 24 outputs updating data to the OSD controller 25 in response to the operating command, thereby moving the scroll bar. When the controller 24 of the cradle 21 receives information of an enter button operating command, the controller 24 outputs, to the portable playback device 31, a playback request to play back a designated piece of music. The portable playback device 31 plays back the designated piece of music, and the reproduced audio signal A2 is played back by the speakers 3L and 3R through the audio selector 9 and the amplification circuit 11.

Figure 6:
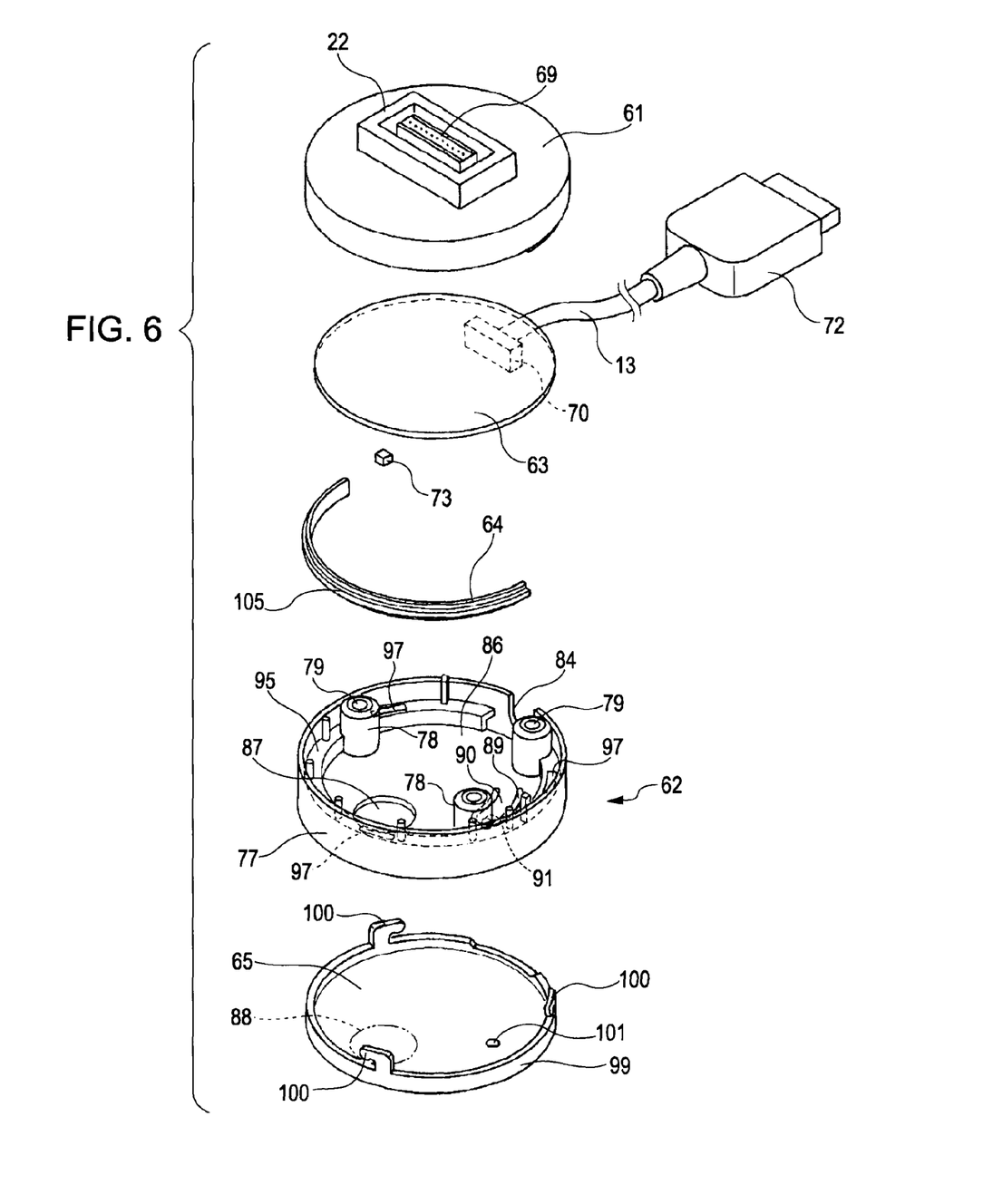
FIG. 6 is an exploded perspective view showing a mechanical construction of a cradle.

Next, the structure of the cradle 21 is described. As shown in FIG. 6, a housing of the cradle 21 consists of an upper case 61 and a lower case 62. The cases 61 and 62 are molded from, for example, an ABS resin, and each have a flat circular cup shape. The cases 61 and 62 form a flat disk-shaped housing when both are combined. In the housing consisting the upper case 61 and the lower case 62, a substantially circular printed circuit board 63 is provided. In addition, an indicator 64 is provided at the junction between the upper case 61 and the lower case 62 so as to extend over substantially a circumferential semicircular portion. In other words, the indicator 64 has a rib 105 on a back side so that the indicator 62 is attached to the cases 61 and 62 in a sandwiched manner. The indicator 64 is intended to perform operation display of the cradle 21. For example, when a predetermined operation is performed, the indicator 64 can perform a light-emitting or blinking operation. The indicator 64 is a translucent white body molded from, for example, an acrylic resin or a polypropylene resin. In addition, a weight 65 as a plumb is attached to an underside of the lower case 62. The weight 65 is used to weight the housing consisting of the upper case 61 and the lower case 62, whereby the cradle 21 is prevented from being moved by an elastic restoring force or the like of a signal cable 13.

The connector 69 is provided in the mounting portion 22 on the top of the upper case 61. When the portable playback device 31 is connected to the mounting portion 22, the connector 69 forms a connection unit for exchanging signals with a connector of the portable playback device 31. On the bottom of the printed circuit board 63, a connector 70 is mounted, and the signal cable 13 is connected to the connector 70. A connector plug 72 is connected to one end of the signal cable 13 and is connected to the connector at the port 12 on the back face of the AV device 1. In addition, on the bottom of the printed circuit board 63, a chip light-emitting diode 73 is mounted. The light-emitting diode 73 forms a light-emitting unit for the indicator 64.

The lower case 62 included in the housing of the cradle 21 has a peripheral wall 77 on a peripheral side thereof. On an inner peripheral side of the peripheral wall 77, three bosses 78 are circumferentially provided in parallel in an axial direction. In each boss 78, a screw-through hole 79 is formed, and a screw 80 is inserted into the screw-through hole 79 (see FIG. 8). An external thread of the screw 80 is screwed in an internal thread hole 82 of a boss 81 provided in an inner portion of the upper case 61. This joins the upper case 61 and the lower case 62.

In a structure in which the upper case 61 and the lower case 62 are joined by using the screw 80, the bosses 78 of the lower case 62 press the printed circuit board 63 to receiving pins 83 inside the upper case 61. This fixes the printed circuit board 62 in the housing. In addition, the indicator 64 is attached in a sandwiched manner to a junction of the peripheral wall 77 between the upper case 61 and the lower case 62. In addition, a U-shaped notch 84 is formed in the peripheral wall 77 of the lower case 62, and the signal cable 13 extends through the U-shaped notch 84.

Figure 7:
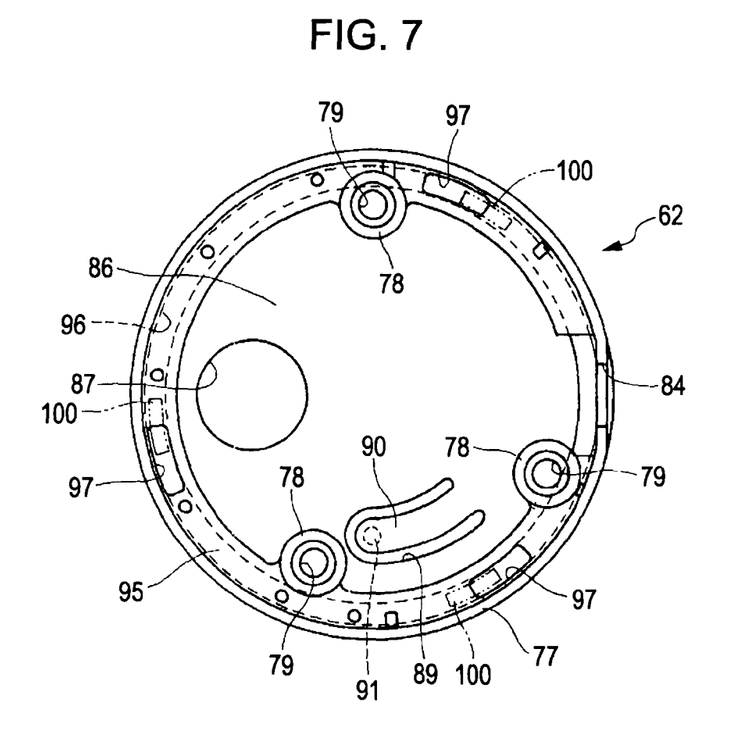
FIG. 7 is a plan view showing a lower case of the cradle.
Figure 8:
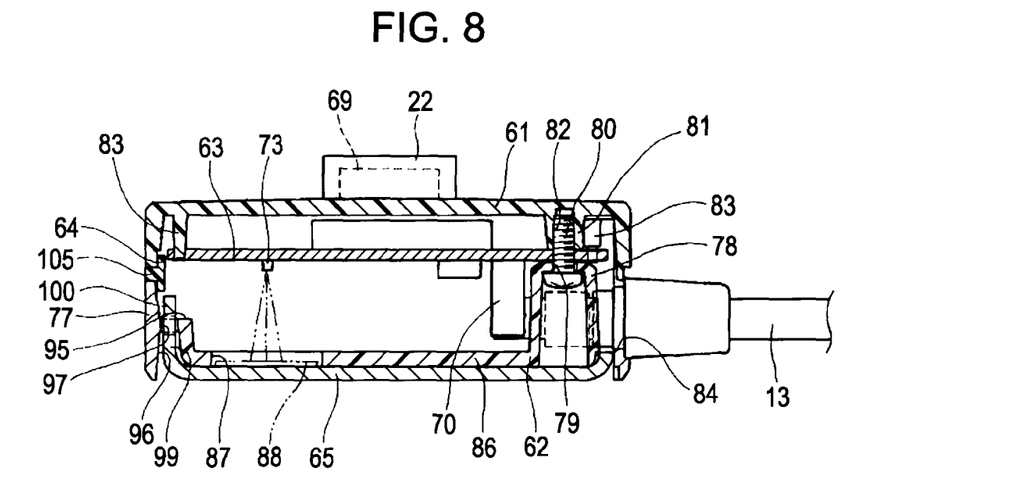
FIG. 8 is a longitudinal sectional view showing a construction of the cradle.
Figure 9:
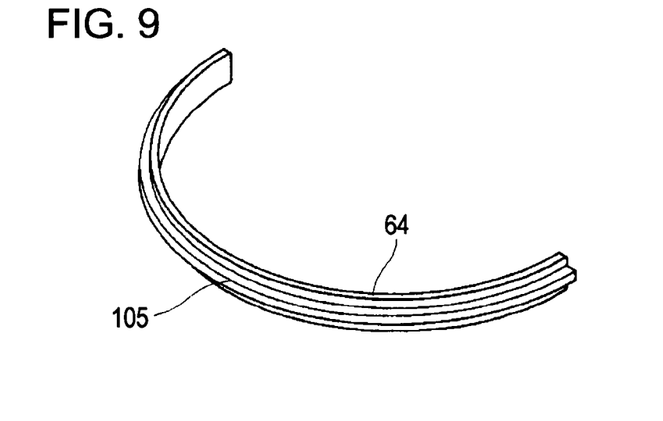
FIG. 9 is an exterior perspective view showing an indicator.
Figure 10:
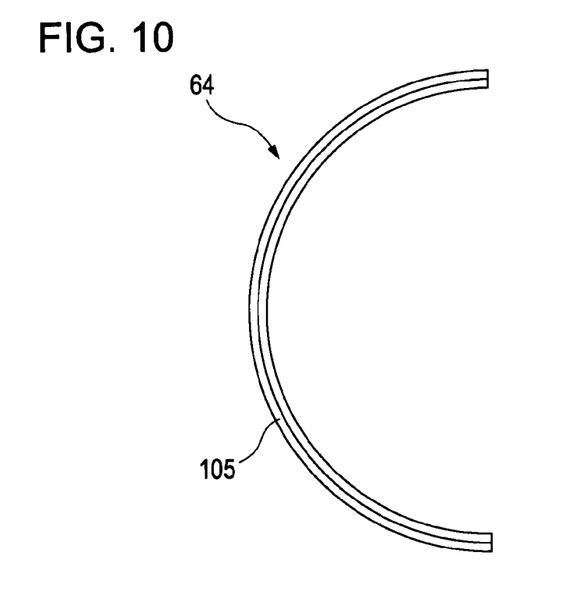
FIG. 10 is a plan view showing the indicator.
Figure 11:
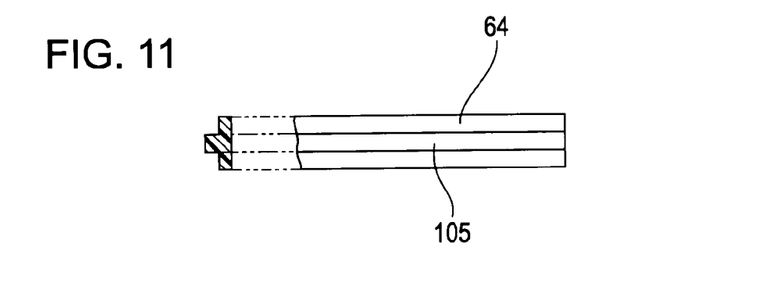
FIG. 11 is a side view showing the indicator, with the indicator partly broken.
Figure 12:
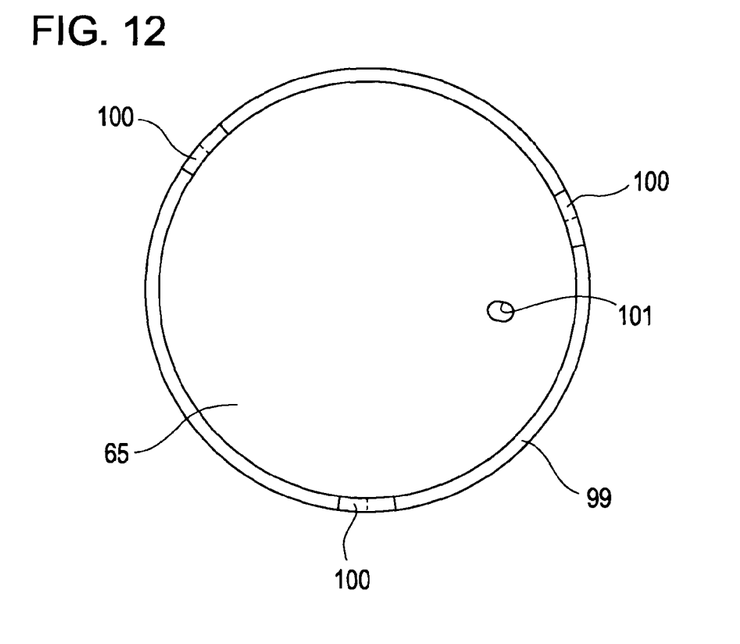
FIG. 12 is a plan view showing a weight.
Figure 13:
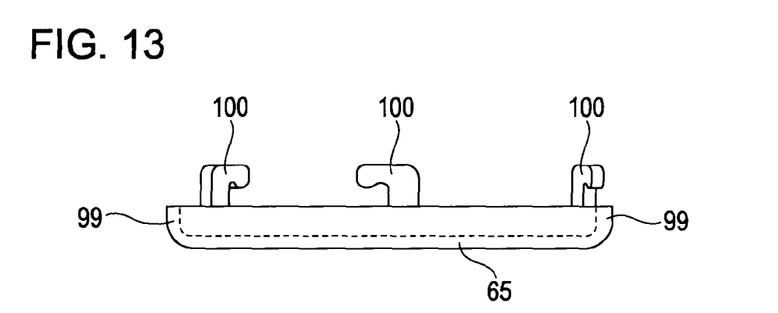
FIG. 13 is a side view showing the weight.
Figure 14:
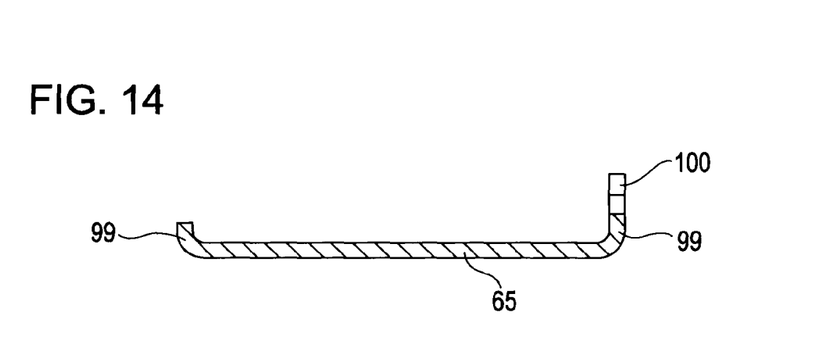
FIG. 14 is a longitudinal sectional view showing the weight.

In a bottom plate 86 of the lower case 62, as shown in FIGS. 6 to 8, a circular opening 87 is eccentrically formed with respect to the center. An elastic member 90 is consecutively provided on the bottom plate 86 of the lower case 62 by a notch 89. On a bottom face of one end of the elastic member 90, a locking protrusion 91 is provided. The locking protrusion 91 is used to perform locking in a state in which a weight 65, which is described later, is closed.

As shown in FIGS. 6 to 8, in the lower case 62 of the housing, a step 95 is circumferentially formed on the peripheral side, and a bottom face of the step 95 serves as a peripheral groove 96. On the step 95, engagement holes 97 that circumferentially extend are circumferentially formed at three positions.

The weight 65 attached to the underside of the lower case 62 is a press-molded body made of a metal sheet having a thickness of, for example, 1 to 2 mm. In addition, its peripheral side serves as a peripheral wall 99. On the peripheral wall 99, inverse-L-shaped pawls 100 are formed at three circumferential positions so as to upwardly protrude. The inverse-L-shaped pawls 100 are engaged in openings of the engagement holes 97 in the step 95 of the lower case 62. In addition, in the weight 65, a lock hole 101 that is a small hole is formed. The lock hole 101 receives the locking protrusion 91 on the underside of the elastic member 90 of the lower case 62. This performs a locking operation in a state in which the weight 65 is attached to the lower case 62.

Next, an operation of causing the indicator 64 of the cradle 21 to emit light is described below. As described above, the upper case 61 and the lower case 62 are fastened by the screws 80. The printed circuit board 63 and the indicator 64 are attached in a sandwiched manner between the upper case 61 and the lower case 62 in an axial direction thereof. An LED 73 is provided on the underside of the printed circuit board 63 (see FIG. 8). As shown in FIG. 8, the LED 73 radiates light in a downwardly perpendicular direction with respect the surface of the printed circuit board 63 as a light radiation direction is indicated by the chain lines. At a position where the light from the LED 73 is radiated, the circular opening 87 is formed in the lower case 62. An internal surface of the weight 65, which is provided under the lower case 62, reflects the light from the LED 73.

The weight 65 under the lower case 62 is a press-molded body made of a metal sheet. A portion of the surface of the printed circuit board 63 which is exposed at least at the circular opening 87 is plated with zinc, whereby a structure of relatively easily reflecting light is established. Instead of this structure, as indicated by the chain line in FIG. 8, a reflection sheet 88 composed of a member different from the weight 65 may be joined or bonded. As the reflection sheet 88, for example, a plastic mirror or metal foil may be used. The circular opening 87 is formed at a position on the lower case 62 under the LED 73, and light emitted from the LED 73 is substantially uniformly reflected to the periphery through the opening 87. In particular, as shown in FIGS. 6 and 7, the indicator 64 is formed in an arc shape so as to extend over a semicircle at the junction between the lower case 62 and the upper case 61, A reflection portion of the weight 65 is provided at the center in the lengthwise direction of the indicator 64 inside the indicator 64.

Therefore, the light from the LED 73 passes through the circular opening 87 in the bottom plate 86 of the lower case 62, and impinges on the internal surface of the weight 65, whereby uniform diffused reflection to the periphery occurs. The light is incident on the indicator 64 provided over a semicircle, and the indicator 64 is caused to uniformly emit light throughout its total length. Therefore, in a case in which a type of operation, for example, signal sending, or another operation is performed, by maintaining the indicator 64 to light up or by causing the indicator 64 to blink, the operating state of the cradle 21 can be displayed. Cases that display operations include a case in which, for example, when the AV device 1 is in an input mode, a signal is transmitted from the cradle 21 by using wireless Bluetooth, and a case in which a signal is transmitted from the personal computer 32 to the cradle 21 by using a wireless LAN.

Such operation display by the indicator 64 needs a simplified structure and is advantageous in cost since the LED 73 alone is used as a light-emitting unit. In addition, the indicator 64 that extends over a semicircle is free from uneven brightness. Also, it is not necessary to provide a light guide plate inside the indicator 64, so that a reduced number of parts is effective in reducing costs. In addition, since the weight 65 is also used as a reflection unit, the need for a special part is eliminated. A portion of the (originally necessary) weight 65 which corresponds to the circular opening 87 of the lower case 62 reflects light. Thus, the indicator 64 can be caused to emit light in its total length.

The weight 65 that reflects the light from the LED 73 to the indicator 64 is joined to the underside of the lower case 62, as shown in FIG. 8. Attachment of the weight 65 to the lower case 62 is performed by the inverse-L-shaped pawls 100 which are consecutively provided at the top of the peripheral wall 99 of the weight 65. Specifically, the weight 65 is attached such that the inverse-L-shaped pawls 100 are engaged in the openings of the engagement holes 97 of the lower case 62, with the peripheral wall 99 of the weight 65 engaged in the peripheral groove 96 of the lower case 62 from below (see FIG. 8).

Figure 15A:
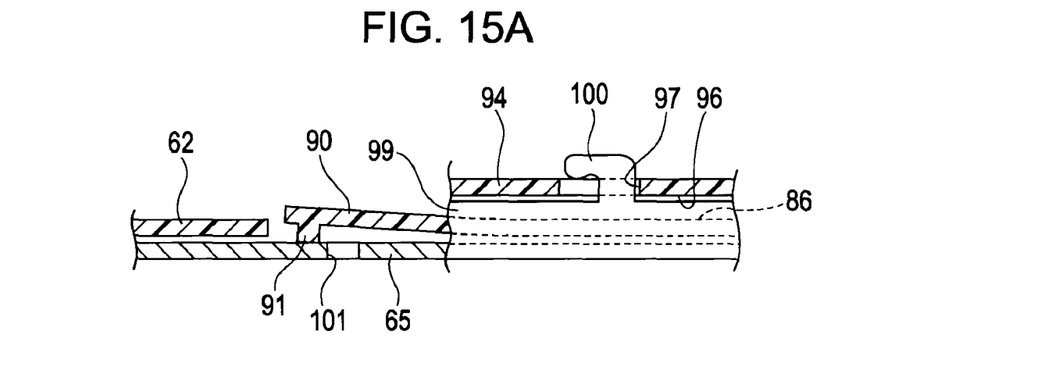
FIGS. 15A, 15B, and 15C are longitudinal sectional chief part views showing locking of the weight to the lower case and an unlocking operation.
Figure 15B:
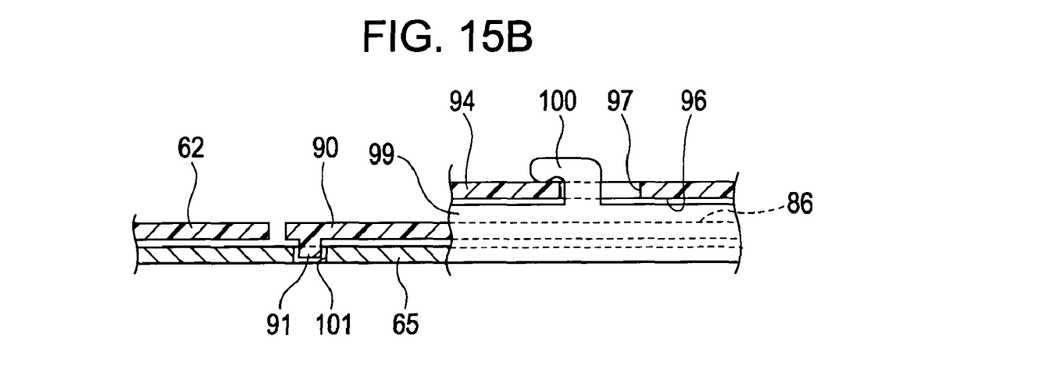

As shown in FIG. 15A, the inverse-L-shaped pawls 100 are inserted in the engagement holes 97 above the peripheral groove 96 in a state in which the peripheral wall 99 of the weight 65 is engaged in the peripheral groove 96. In this state, when the weight 65 is circumferentially turned to the lower case 62 by a small angle of 10 degrees or less, for example, 5 degrees, as shown in FIG. 15B, the inverse-L-shaped pawls 100 are engaged in the openings of the engagement holes 97. In addition, the locking protrusion 91 on the underside of the elastic member 90 of the lower case 62 is engaged in the lock hole 101 of the weight 65. Therefore, in this state, the weight 65 cannot turn with respect to the lower case 62. Accordingly, the weight 65 is locked, with the inverse-L-shaped pawls 100 engaged in the openings of the engagement holes 97 of the lower case 62, so that the weight 65 cannot be disengaged from the lower case 62.

Figure 15C:
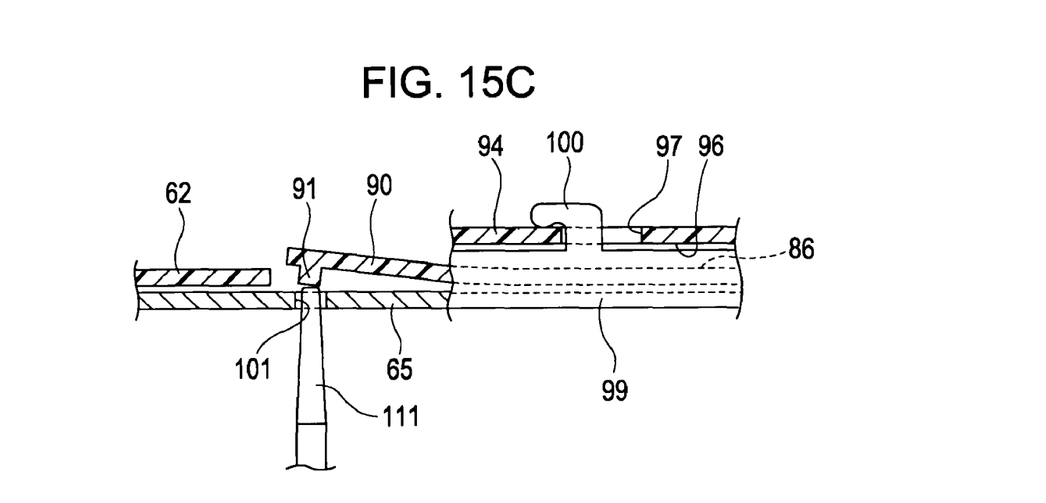

Next, in the case of disassembly, as shown in FIG. 15C, a pin 111 is used as a pressing tool. As shown in FIG. 15C, the pin 111 is inserted into the lock hole 101 of the weight 65, whereby the locking protrusion 91 of the elastic member 90 is disengaged from the lock hole 101. In this state, by using the pin 111, the lower case 62 is pressed right in FIG. 15C, the state shown in FIG. 15A appears. In other words, the locking protrusion 91 of the elastic member 90 is disengaged from the lock hole 101, and the inverse-L-shaped pawls 100 are disengaged from the openings of the engagement holes 97. Accordingly, by downwardly moving the weight 65 from the lower case 62, the weight 65 can be separated from the lower case 62.

Figure 16A:
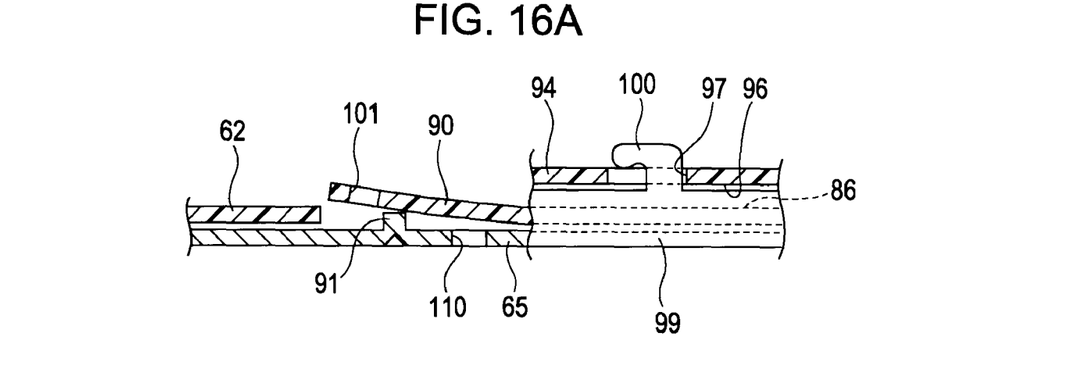
FIGS. 16A, 16B, and 16C are longitudinal sectional chief part views showing attachment of the weight to the lower case in a modification and an operation of unlocking the weight.
Figure 16B:
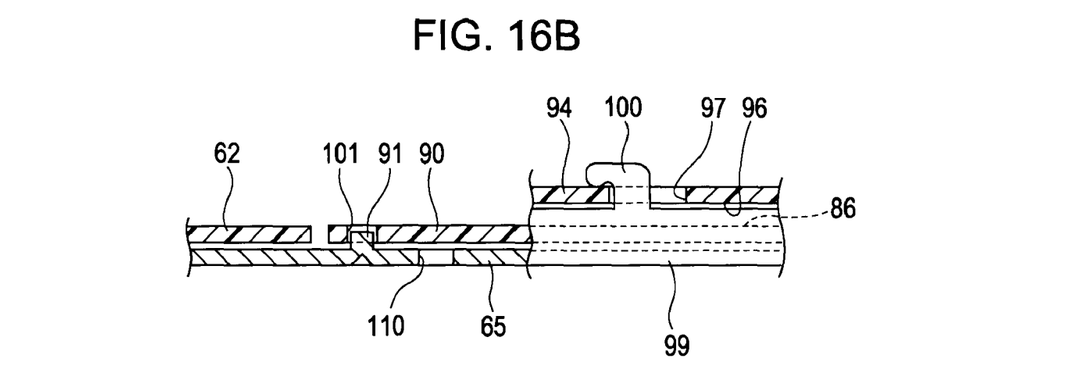
Figure 16C:
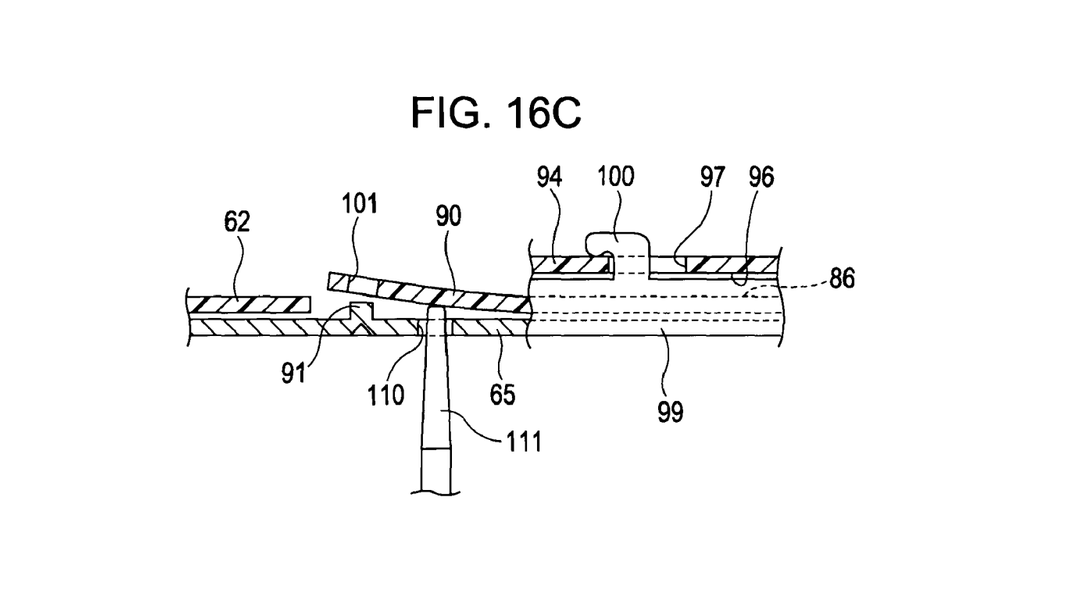

FIGS. 16A to 16C show a modification of a locking mechanism of the weight 65. Here, the lock hole 101 is formed in the elastic member 90 of the lower case 62. A position at which the lock hole 101 is formed may be an end of the elastic member 90. At a predetermined position of the weight 65, the locking protrusion 91 is press-molded at the same time. In addition, a disengagement hole 110 is formed at a position biased toward the base of the elastic member 90 in a side portion of the locking protrusion 91.

FIG. 16A shows a state in which the weight 65 is incorporated in the lower case 62. At this time, the inverse-L-shaped pawls 100 of the weight 65 are inserted into the engagement holes 97. Also, at this time, the inverse-L-shaped pawls 100 are not engaged in the openings of the engagement holes 97.

In this state, by circumferentially turning the weight 65 with respect to the lower case 62 by a predetermined small angle of 10 or more degrees, as shown in FIG. 16B, the inverse-L-shaped pawls 100 of the weight 65 are engaged in the openings of the engagement holes 97 of the lower case 62. At the same time, the lock hole 101 of the elastic member 90 of the lower case 62 receives the locking protrusion 91, whereby the weight 65 is locked in a state in which the inverse-L-shaped pawls 100 are engaged in the openings of the engagement holes 97.

When this locking state is canceled, as shown in FIG. 16C, the pin 111 is inserted into the disengagement hole 110. This elastically deforms the elastic member 90, and the engagement between the lock hole 101 and the locking protrusion 91 of the weight 65 is released. In this state, by using the pin 111 to circumferentially turn the weight 65 with respect the lower case 62 by a predetermined angle, the state shown in FIG. 16A appears, and the engagement between the inverse-L-shaped pawls 100 and the engagement holes 97 is released. Therefore, by downwardly moving the weight 65 with respect to the lower case 62, the weight 65 can be separated from the lower case 62 for dismantlement.

The present invention has been described with reference to an illustrated embodiment. However, the present invention can be variously modified within the scope of a technical idea of the present invention without being limited to the above-described embodiment. For example, a circumferential angle of the indicator 64 to the cradle 21 in the above embodiment, and shapes of other parts can be variously modified.

What is claimed is:

1. A cradle comprising:
    a housing;
    an indicator configured to display a status by emitting light, the indicator having an inner surface located inside the housing and an outer surface exposed to an outer peripheral surface of the housing, and the inner and outer surfaces extending along a long axis of the indicator;
    light-emitting means serving as a light source for causing the indicator to emit light; and
    a weight including reflection means for guiding the light emitted from the light-emitting means to the indicator by reflecting the emitted light to the inner surface of the indicator, the reflection means separate from the indicator, and the indicator emitting the reflected light through the outer surface of the indicator to display the status, wherein
    the weight is provided under the housing,
    the reflection means of the weight is exposed at an opening in the housing, and
    the light emitted from the light-emitting means is guided to the indicator in such a manner that the emitted light is reflected through the opening by the reflection means of the weight.

2. The cradle according to claim 1,
    wherein the housing includes a mounting portion on which a portable playback device is mounted.

3. The cradle according to claim 2,
    wherein the mounting portion on which the portable playback device is mounted includes a connector.

4. The cradle according to claim 1, further comprising an antenna for receiving a signal from an information terminal.

5. The cradle according to claim 1,
    wherein the light-emitting means is a light-emitting diode mounted on a circuit board provided in the housing.

6. The cradle according to claim 1,
wherein the indicator is an arc-shaped translucent-white light guide member which is exposed at the outer peripheral surface of the housing and which extends circumferentially.

7. The cradle according to claim 6,
wherein the reflection means is included in the weight provided under the housing.

8. The cradle according to claim 6,
wherein the reflection means is formed on a surface of the weight provided under the housing.

9. The cradle according to one of claims 7 and 8, wherein the reflection means is provided, inside the arc-shaped translucent-white light guide member, in proximity to the circumferential center of the arc-shaped translucent-white light guide member.

10. A cradle comprising:
a housing;
an indicator configured to display a status by emitting light;
light-emitting means serving as a light source for causing the indicator to emit the light; and
reflection means for guiding the light emitted from the light-emitting means to the indicator by reflecting the emitted light to the indicator,
wherein the indicator is mounted in a junction between an upper case and a lower case that form the housing, and
wherein a weight is attached to an underside of the lower case and the weight is provided with the reflection means.

11. The cradle according to claim 10,
wherein the upper case and the lower case are bonded to each other by screws screwed from the side of the lower case, and
wherein the weight is attached to the underside of the lower case so as to cover heads of the screws.

12. The cradle according to claim 11,
wherein pawls are provided at a periphery of the weight and the pawls are engaged in openings of engagement holes of the lower case, and
wherein the weight is locked such that a locking protrusion of an elastic member of the lower case is inserted into a lock hole of the weight.

13. The cradle according to claim 12,
wherein the pawls of the weight are disengaged from the openings of the engagement holes in such a manner that the elastic member is elastically deformed by inserting a pin from the lock hole to press the locking protrusion and the weight is circumferentially turned by a small angle, with the locking protrusion disengaged from the lock hole.

14. The cradle according to claim 11,
wherein pawls are provided at a periphery of the weight and the pawls are engaged in openings of engagement holes of the lower case, and
wherein the weight is locked such that a lock hole of an elastic member of the lower case receives a locking protrusion of the weight.

15. The cradle according to claim 14,
wherein the pawls of the weight are disengaged from the openings of the engagement holes in such a manner that the weight is circumferentially turned by a small angle in a state in which engagement between the lock hole of the elastic member and the locking protrusion of the weight is released by inserting a pin through a small hole of the weight to press the elastic member of the lower case.

16. A cradle comprising:
a housing;
a curved indicator configured to display a status by emitting light, the indicator having an inner peripheral surface located inside the housing and an outer surface exposed to an outer peripheral surface of the housing, and the inner and outer surfaces extending along a long axis of the indicator;
a light-emitting unit serving as a light source for causing the indicator to emit light; and
a weight including a reflection unit configured to guide light emitted from the light-emitting unit to the indicator by reflecting the emitted light to the indicator to provide a uniform diffused reflection of the emitted light to the inner peripheral surface of the indicator, the reflection unit separate from the indicator, and the indicator displaying the status by emitting the reflected light through the outer surface, wherein
the weight is provided under the housing,
the reflection unit of the weight is exposed at an opening in the housing, and
the light emitted from the light-emitting unit is guided to the indicator in such a manner that the emitted light is reflected through the opening by the reflection unit of the weight.

17. A cradle comprising:
a housing;
an indicator configured to display a status by emitting light;
a light-emitting unit serving as a light source for causing the indicator to emit the light; and
a reflection unit configured to guide the light emitted from the light-emitting unit to the indicator by reflecting the emitted light to the indicator,
wherein the indicator is mounted in a junction between an upper case and a lower case that form the housing, and
wherein a weight is attached to an underside of the lower case and the weight is provided with the reflection unit.

* * * * *